Patented Aug. 1, 1944

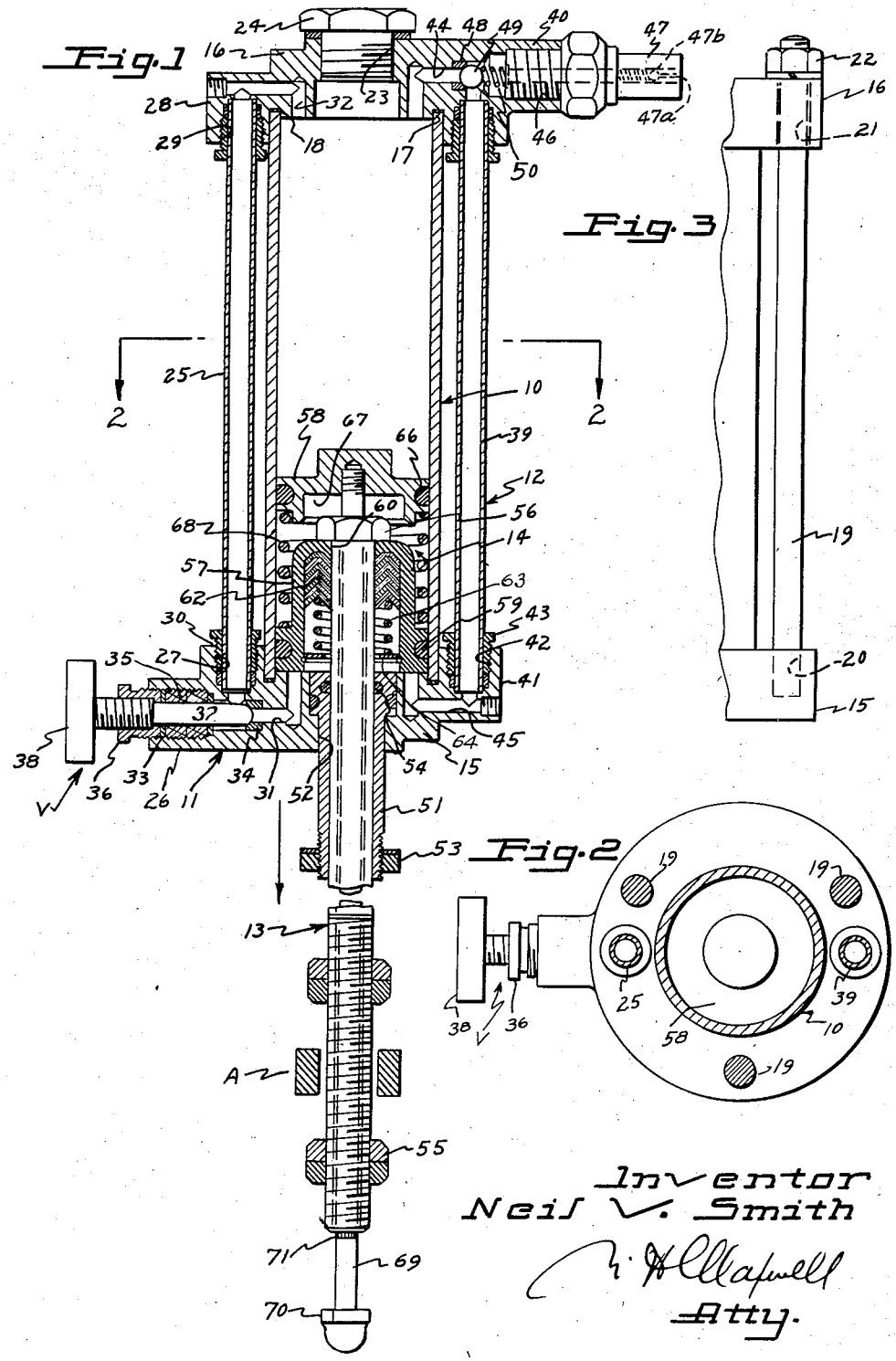

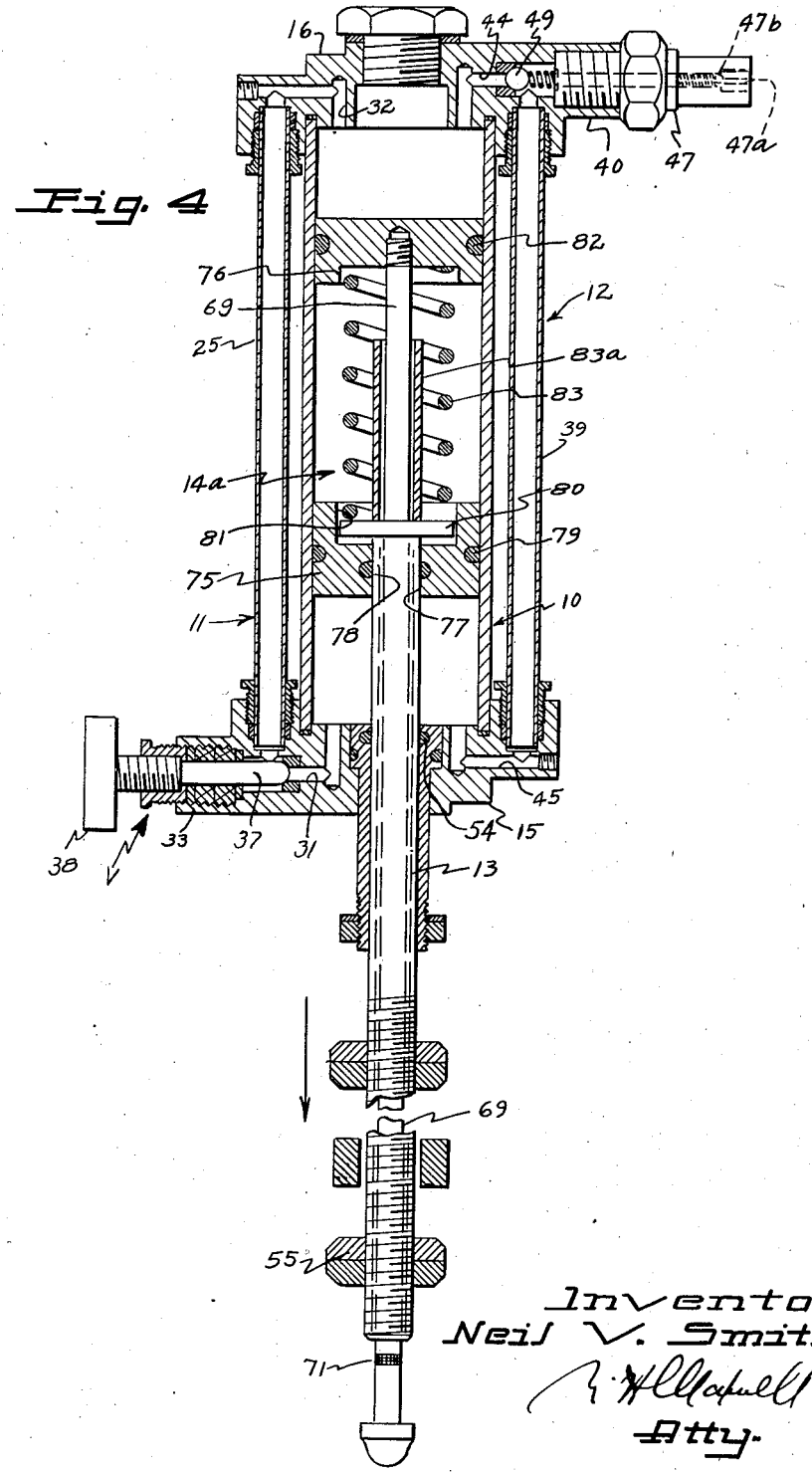

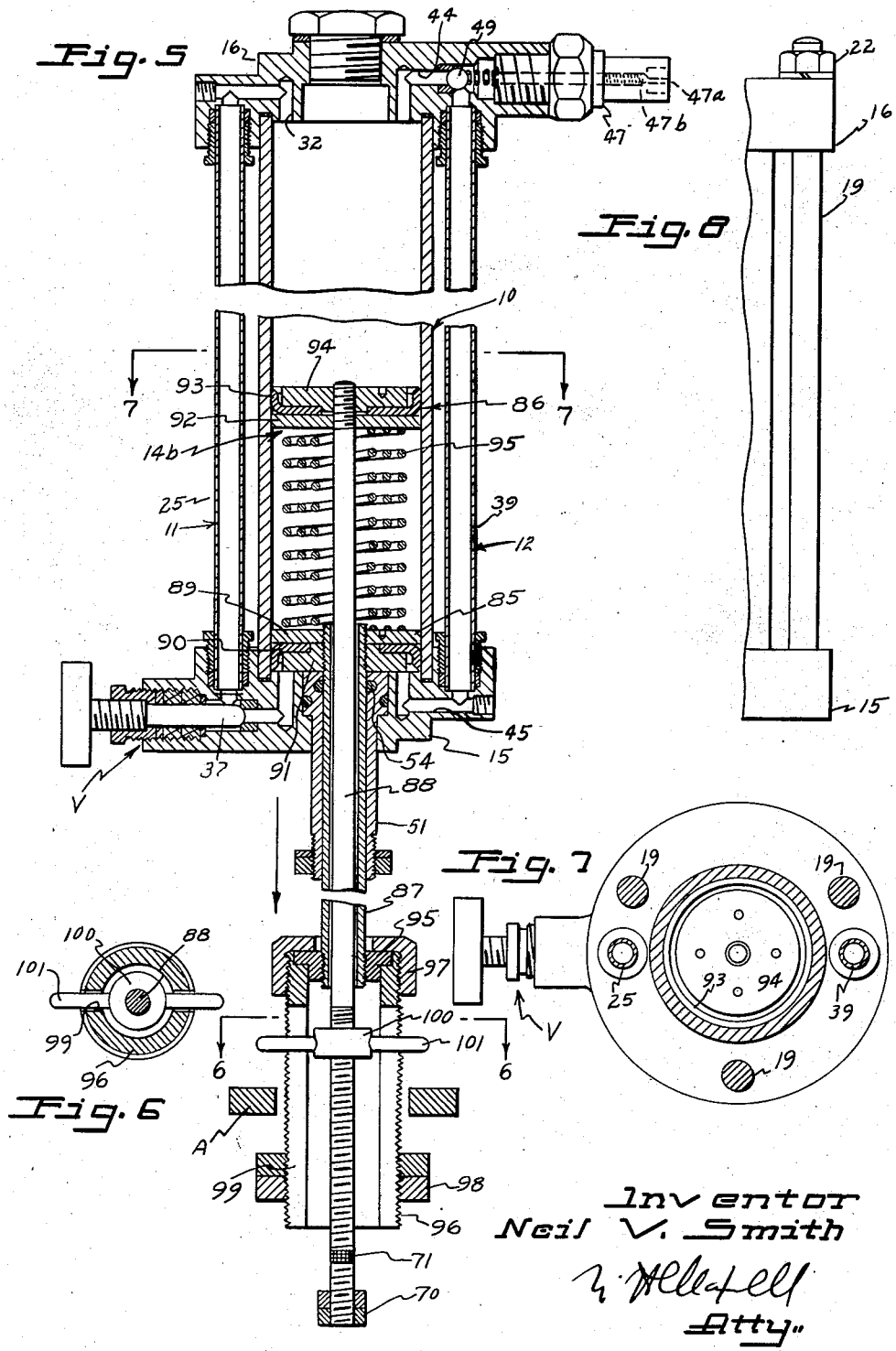

2,354,889

UNITED STATES PATENT OFFICE 2,354,889

HYDRAULIC MOVEMENT-CONTROLLING DEVICE

Neil V. Smith, Los Angeles, Calif., assignor, by mesne assignments, to Senacon Service Company, Cleveland, Ohio, a partnership Application January 28, 1943, Serial No. 473,788

17 Claims. (Cl. 188—97)

This invention relates to devices for controlling the movement of machine parts and relates more particularly to hydraulic movement-controlling devices. A general object of the invention is to provide a practical, effective hydraulic movement-controlling device that is small, compact, and entirely self-contained.

It is often necessary to govern the relative movement of machine tool parts, or the like. A hydraulic cylinder and piston type movement-checking device is most advantageous for such a purpose, but there are certain factors that have limited the application of this type of device. It is essential to the proper functioning of the device that the active end of the cylinder be completely occupied by a substantially noncompressible fluid and that voids be prevented from developing therein. Movement of the piston rod in either direction, in a simple piston and cylinder structure in which the active end of the cylinder contains a substantially non-compressible fluid, varies the net capacity of the cylinder and these variations must be compensated for in order to make the device operative. A balance rod has been used to compensate for these variations, but the use of a balance rod does not compensate for incidental leakage of liquid, nor for the differential in the expansion and contraction of the hydraulic liquid and the sealed cylinder system resulting from temperature changes. The differential in the expansion and contraction of the hydraulic liquid and the cylinder structure, and the incidental leakage of liquid from the cylinder, develop voids in the system and may cause air to find its way into the cylinder. This prevents the balance rod device from functioning properly.

My co-pending application, Serial No. 473,787, filed January 28, 1943, discloses several forms of hydraulic movement controlling devices which embody spring loaded or resilient means acting on the liquid in the cylinder to compensate for the incidental leakage of liquid, the differential in the expansion and contraction of the liquid and cylinder structure, and for changes in the net capacity of the cylinder resulting from piston rod movement. The yielding compensating means of my co-pending application are not in any case positively actuated by the piston rod during the return stroke of the rod, and may yield as a result of inertia effects and friction effects during such return stroke, with the result that a reduced pressure is created in the cylinder. This reduced pressure makes it necessary to employ a sealing means at the piston rod to prevent air from being drawn into the cylinder. This vacuum packing adds to the size of the device and increases its cost.

Another object of this invention is to provide a movement controlling device of the general character referred to that automatically compensates for the changes in the net capacity of the cylinder due to piston rod movement, the differential in the expansion and contraction of the liquid and the cylinder structure due to temperature changes, and for the incidental leakage of liquid from the cylinder system.

Another object of this invention is to provide a movement controlling device of the character mentioned embodying a novel piston means that maintains the liquid in the cylinder under superatmospheric pressure throughout its entire operating cycle, that compensates for piston rod movement, incidental leakage of liquid from the cylinder system, and the differential in the expansion and contraction of the liquid and cylinder structure due to temperature changes.

Another object of this invention is to provide a movement controlling device of the character referred to in which the piston means does not create a reduced or negative pressure in the cylinder at any phase of the piston stroke. This is highly important because there is no necessity to provide a vacuum sealing means to seal against a vacuum and prevent the inward leakage of air around the piston rod.

Another object of this invention is to provide a movement-controlling device of the character mentioned embodying a single piston rod operatively connected with the two elements of the piston through a slack or lost motion connection to positively push one piston element during one stroke of the piston, and to positively draw or pull the other piston element during the other piston stroke, providing for a positive piston action in both directions and yet allowing for expansion of the liquid due to temperature changes and allowing for variations in the net capacity of the cylinder due to piston rod movement.

Another object of this invention is to provide a movement controlling device of the character mentioned that may be single acting and that may have certain of its parts interchanged at will so that it is conditioned to have its active movement resisting stroke in either direction at will, or if desired, may be made double acting to be effective in resisting movement of the machine part in both directions. The parts may be easily interchanged to bring about this reversal in action or double action after the device has been constructed and assembled, for example, the parts may be readily interchanged when the device is installed or any time thereafter.

Another object of this invention is to provide a movement-controlling device of the character referred to that may be readily regulated to offer any selected or required degree of resistance to movement of the machine part and, if desired, may be regulated to offer a high degree of resistance to such movement.

A further object of this invention is to provide a device of the character mentioned that embodies means to facilitate the replenishing of the liquid in the cylinder as required, from time to time, and indicating means which disclose when a sufficient quantity of liquid has been supplied to the cylinder and when the liquid in the cylinder requires replenishing.

The various objects and features of my invention will be fully understood from the following detailed description of typical preferred forms and applications of my invention, throughout which description reference is made to the accompanying drawings, in which:

Fig. 1 is a longitudinal detailed sectional view of one form of the invention. Fig. 2 is a transverse detailed sectional view taken as indicated by line 2—2 on Fig. 1. Fig. 3 is a fragmentary external view of the device of Fig. 1. Fig. 4 is a view similar to Fig. 1 illustrating another form of the invention. Fig. 5 is a view similar to Fig. 1 illustrating still another form of the invention. Figs. 6 and 7 are transverse detailed sectional views taken as indicated by lines 6—6 and 7—7, respectively, on Fig. 5, and Fig. 8 is a fragmentary external view of the device shown in Fig. 5.

The movement controlling devices of the invention have many applications and may be varied to adapt them for given uses. The devices are particularly well suited to control the movement of machine tool cutting parts that have pneumatic operating means, and in the drawings I have illustrated three typical embodiments of the invention adapted for such use. Where employed to control the movement of a machine tool cutting part operated by a pneumatic means, the hydraulic device of the invention may be adjusted to resist or oppose the movement with a uniform resistance much greater than that resulting from the cutting tool reaction, thereby assuring a smooth and substantially uniform motion of the cutting tool through the wash piece. When a device of the invention is single acting it operates to offer a selected degree of resistance to movement in one direction and to allow substantially free unrestrained movement in the other direction. When the device is double acting it may be adjusted to offer any selected degree of resistance to movement in either direction.

The form of the invention illustrated in Figs. 1 to 3 of the drawings may be said to comprise, generally, a cylinder 10, regulable means 11 for conducting liquid from the inner end of the cylinder 10 to the outer end of the cylinder, means 12 for conducting fluid from the outer end of the cylinder 10 to the inner end of the cylinder; a piston rod 13 adapted to be operatively connected with a moving machine part A, and piston means 14 on the piston rod 13 operable in the cylinder 10 and adapted to compensate for differences in the net capacity of the cylinder 10 due to movement of the rod 13, for the differential in the expansion and contraction of the liquid and the cylinder structure due to temperature changes, and for the incidental leakage of liquid from the cylinder.

The cylinder 10 may be a simple, elongate tubular member provided at its inner and outer ends with heads 15 and 16. The end portions of the cylinder 10 are received in annular grooves 17 in the heads 15 and 16 and the grooves 17 carry gaskets 18 for sealing with the ends of the cylinder. Simple, effective means is provided for securing the two heads 15 and 16 on the opposite ends of the cylinder. This means includes a series of rods 19 screw threaded or otherwise fixed in openings 20 in the marginal portions of one head and passing through openings 21 in the marginal portions of the other head. Nuts 22 are screw threaded on the rods 19 and clamp against said other head to hold the heads on the ends of the cylinder 10. It will be seen how the end portions of the cylinder 10 are tightly engaged in the grooves 17 when the nuts 22 are tightened down. The outer head 16 is preferably provided with a filling opening 23 to facilitate the introduction of the liquid to the cylinder. The opening 23 is normally closed by a gasketed threaded plug 24.

The means 11 serves to conduct the liquid from the inner portion of the cylinder 10 to the outer portion of the cylinder during movement of the piston means 14 in the direction of the arrow in Fig. 1. It will be assumed that this is the active stroke of the piston means 14 and that the device is utilized to offer resistance to movement of the machine part A in this direction. The liquid conducting means 11 includes a tube 25 extending longitudinally of the cylinder 10. The head 15 has a lateral boss 26 provided with a socket 27. The head 16 has a smaller boss 28 provided with a similar socket 29. The opposite ends of the tube 25 are received in the sockets 27 and 28. Packing glands 30 are engaged in the sockets 27 and 29 to seal about the opposite end portions of the tube 25. A port 31 in the head 15 leads from the inner end of the cylinder 10 to the adjacent end of the tube 25. A similar port 32 is provided in the head 16 and extends from the outer end of the cylinder 10 to the adjacent end of the tube 25.

The means 11 further includes a throttle valve V for governing the flow of liquid from the inner end to the outer end of the cylinder 10 to resist movement of the part A during the active stroke. The throttle valve V is carried by the head 15 and controls the flow of liquid through the port 31. The boss 26 has an opening 33 joining the port 31. A valve seat 34 is engaged in the inner portion of the opening 33 where the opening joins the port 31. The outer portion of the opening 33 is enlarged in diameter and carries packing 35 and a gland 36. A valve stem 37 is adjustably screw threaded through the gland 36 and passes inwardly through the packing 35. The inner end of the stem 37 opposes the valve seat 34 and is cooperable with the seat to restrict the flow of liquid through the port 31. An operating knob 38 is provided on the outer end of the stem 37 to facilitate adjustment of the valve stem. The throttle valve V is readily regulated by means of the knob 38.

The means 12 serves to conduct fluid from the outer end of the cylinder 10 to the inner end of the cylinder during the return stroke of the part A and the piston means 14. The means 12 resembles the means 11 and includes a tube 39 extending longitudinally at the exterior of the cylinder 10. The outer head 16 is provided with a lateral boss 40 and the inner head 15 has a smaller boss 41. The opposite ends of the tube 39 are received in sockets 42 in the bosses 40 and 41 and packing glands 43 are threaded in the sockets to secure and seal about the opposite ends of the tube. A port 44 in the head 16 leads from the outer end of the cylinder 10 to the adjacent end of the tube 39 and a similar port 45 in the head 15 connects the inner end of the cylinder 10 with the tube 39. A lateral opening 46 is provided in the boss 40 of the head 16 to intersect or join the port 44. The opening 46 is preferably the same as the above described opening 33 having an enlarged threaded outer portion.

A valve seat 48 of the same character as the above described seat 34 is arranged in the inner portion of the opening 46. A check valve 49 is urged inwardly against the seat 48 by a spring 50 which is arranged under compression between the valve and the inner end of the fitting 47. The valve 49 prevents the flow of liquid through the means 12 during the active stroke of the part A and opens to allow the free flow of liquid through the means 12 during the return stroke. It will be observed that the throttle valve V and the fitting 47 with the related check valve 49 may be exchanged one for the other, that is, they may be reversed to reverse the action of the device. This will be more fully described.

A liquid supply fitting 47 is threaded in the enlarged portion of the opening 46. The fitting 47 may be in the nature of a grease gun fitting and is employed to replenish the liquid of the cylinder 10, as will be more fully described. The port or passage 47ª through the fitting 47 is provided with a check valve 47ᵇ which prevents outward flow or leakage of liquid from the fitting.

The piston rod 13 is operatively connected with the machine part A by any suitable or selected means and extends through the cylinder head 15 to connect with the piston means 14 within the cylinder 10. In the preferred construction a bushing or sleeve 51 is secured in a central opening 52 in the head 15 and projects outwardly from the head. The sleeve 51 may carry an adjustable mounting nut 53 to facilitate mounting of the device. The piston rod 13 slidably passes through the sleeve 51 to enter the cylinder 10. Sealing means 54 is provided in the sleeve 51 to seal about the piston rod. The rod 13 is tubular for the purpose to be hereinafter described.

In the application of the invention illustrated the rod 13 is equipped to be moved or reciprocated by the machine part A. The part A is in the nature of a yoke which straddles the rod 13 with clearance. The outer portion of the piston rod 13 is threaded and carries spaced pairs of nuts 55 to be engaged by the part A. It is often desirable or necessary to space the pairs of nuts 55 so that there is substantial play or lost motion between the part A and the spaced sets of nuts. The nuts 55 may be shifted or adjusted to vary the extent of this slack.

The piston means 14 is an important feature of the invention. The means 14 is moved or operated by the machine part A through the medium of the piston rod 13 and acts on the liquid within the cylinder 10 to force or circulate the liquid from one end of the cylinder to the other. The control or restriction of this movement of the liquid by the throttle valve V controls movement of the machine part A. In addition to the conventional piston action the piston means 14 serves to maintain the liquid in the cylinder 10 under superatmospheric pressure and further serves to compensate for variations in the net capacity of the cylinder due to piston rod movement, for the differential in expansion and contraction of the liquid and the cylinder structure, and for incidental leakage of liquid from the cylinder system. These functions of the piston means 14 assure the continued successful operation of the device.

The piston means 14 includes an enlargement or head 56 on the inner end of the piston rod 13 and two relatively movable piston elements 57 and 58 engaged and moved by the head 56. In the simple structure illustrated the head 56 is in the form of a nut fixed on the inner end of the piston rod 13. The elements 57 and 58 are arranged at opposite sides of the head 56, the element 57 being in front of the head and the element 58 being behind the head. The piston element 57 is provided at its periphery with an annular groove containing a sealing ring 59 for slidably sealing with the wall of the cylinder 10. The piston rod 13 and the piston element 57 are related for relative movement and the element has a central opening 60 slidably receiving the rod. The piston element 57 carries means for sealing with the piston rod 13. In practice the piston element 57 may be cup-shaped to contain a sealing ring assembly 62. The sealing ring assembly is held active by a spring 63. The spring 63 is held under compression between the packing ring assembly 62 and a washer 64 which bears against a ring engaged within the cup-shaped element 57. The piston element 57 has a flat inner end engageable by the head 56. When the part A is moved in the direction of the arrow in Fig. 1 the head 56 comes into engagement with the element 57 to move the piston element forwardly in the cylinder 10.

The piston element 58 may be a simple, disc-like part provided at its periphery with an annular groove containing a sealing ring 66 for slidably sealing with the wall of the cylinder 10. The inner side of the element 58, which faces the element 57, may have a socket 67 for freely receiving the head 56. When the machine part A moves in a direction counter to the arrow in Fig. 1 the head 56 moves into cooperation with the element 58 to push the element rearwardly through the cylinder 10.

The piston elements 57 and 58 are shaped and are spaced apart so that the head 56 and the elements have substantial relative movement. The invention provides spring means for yieldingly urging the elements against the liquid in the cylinder. A coiled spring 68 is arranged under compression between the piston elements 57 and 58. The spring 68 is held in position through its engagement around the cup-shaped element 57. The spring 68 urges the piston elements 57 and 58 apart to maintain the liquid in the cylinder 10 under superatmospheric pressure. The relative movement between the piston rod 13 and the piston elements 57 and 58 is ample to compensate for changes in the net capacity of the cylinder 10 due to piston rod movement and for the differential in contraction and expansion of the liquid and the cylinder structure. It will be seen that as the quantity or volume of the liquid in the cylinder diminishes due to leakage, the elements 57 and 58 move a greater distance apart under the action of the spring 68. With the construction described above the head 56 of the piston rod 13 is adapted to directly cooperate with the spring-urged piston elements 57 and 58 to positively move the elements in the cylinder 10, the engagement of the head 56 with the element 57 serving to pull the element through the cylinder while the engagement of the head 56 with the element 58 positively pushes the element through the cylinder.

The invention includes means for indicating when the liquid requires replenishing and for indicating when sufficient liquid has been added to the cylinder 10 at the times of filling and replenishing. This means includes a rod 69 fixed to the piston element 58 and extending outwardly through the tubular piston rod 13 to project beyond the outer end of the rod. An indicating head 70 is fixed on the outer end of the rod 69. An indicating band 71 is provided on the rod 69 at a point spaced some distance from the head 70. In initially filling the cylinder 10 the main bulk of the liquid may be introduced through the opening 23. When the plug 24 has been returned to the opening 23 the balance of the liquid is supplied to the cylinder under pressure through the fitting 47. This delivery of liquid under pressure to the cylinder 10 puts the spring 68 under pressure and moves the piston elements 57 and 58 toward one another. As a result the indicating rod 69 is moved outwardly through the piston rod 13. When a sufficient quantity of liquid has been supplied to the cylinder 10 the indicating band 71 becomes visible at the outer end of the piston rod 13. The appearance of the band 71 indicates that a sufficient quantity of liquid has been supplied to the cylinder 10. If incidental leakage occurs during the operation of the device the spring 68 moves the elements 57 and 58 a greater distance apart with the result that the rod 69 is moved inwardly in the piston rod 13. This may continue until the head 70 approaches the outer end of the piston rod 13. When the head 70 reaches or approaches the outer end of the piston rod 13 the operator is informed that the supply of liquid in the cylinder 10 requires replenishing.

In the operation of the form of the invention illustrated in Figs. 1, 2 and 3 of the drawings the cylinder 10 is supplied with liquid under pressure in the manner described above, and the nuts 55 are adjusted to provide for the desired drag link connection between the part A and the piston rod 13. It will be seen that during reciprocation of the part A, the part alternately comes into engagement with the spaced sets of nuts 55 to reciprocate the piston rod 13. During each active stroke of the part A, that is, during movement of the part A in the direction of the arrow in Fig. 1, the part moves into engagement with the outer set of nuts 55 to move the piston rod. This movement of the piston rod 13 brings the head 56 into engagement with the piston element 57 and the head engaging with the element 57 obliges the element to move forwardly with the piston rod. The piston element 57 is positively moved forwardly in the cylinder to force the liquid in the forward end of the cylinder through the means 11 to the rear end of the cylinder. The flow of liquid through the means 11 is controlled by the throttle valve V.

The valve V may have been previously adjusted to restrict the flow through the means 11 to any selected degree. It will be apparent that regulation of the valve V determines the degree of resistance to movement of the part A offered by the device. In practice the valve V may be adjusted to offer a high degree of resistance to movement of the part A in the direction of the arrow in Fig. 1, and this resistance may be greater than the cutting tool reaction to make the movement of the machine part substantially uniform. The liquid forced through the means 11 by the forward motion of the piston element 57 enters the rear end of the cylinder 10 and pushes the piston element 58 forwardly.

Upon the return stroke of the part A the piston rod 13 is moved inwardly or rearwardly and the head 56 comes into engagement with the piston element 58 to positively push the element rearwardly in the cylinder 10. It is important to note that the element 58 is directly and positively moved rearwardly by the piston rod 13 during the return stroke of the machine part A and that there are no spring urged pistons or other resilient means that yield because of inertia and friction effects to create a reduced pressure in the cylinder 10. Rearward movement of the piston element 58 forces liquid from the rear end of the cylinder 10 through the means 12 to the forward end of the cylinder. The check valve 49 opens to allow a substantially free flow of the liquid through the means 12, allowing for a rapid free return stroke of the machine part A.

The action of the device may be readily reversed to offer controlled or selected resistance to movement of the machine part A in a direction counter to the arrow in Fig. 1 and to permit free unrestrained return movement of the machine part. This is accomplished by merely reversing the positions of the throttle valve V and the fitting 47 with its related check valve 49. As above described the openings 43 and 46 are alike so that the throttle valve V and the fitting 47 with its valve 49 may be readily exchanged. With the throttle valve V engaged in the opening 46 the valve may be regulated to restrict the flow through the means 12 to any selected degree so that outward movement of the piston element 58 by the part A, through the medium of the piston rod 13, may be resisted to the selected extent. During the return stroke, that is, during movement of the part A in the direction of the arrow in Fig. 1, the liquid in the forward end of the cylinder is forced out through the means 11 to the rear end of the cylinder, the flow through the means 11 being substantially unobstructed to allow unrestrained return movement of the part A.

The device of Figs. 1, 2 and 3 of the drawings may be readily made double acting. To accomplish this the fitting 47 with its related check valve 49 is removed from the opening 46 and is replaced by a throttle valve V, and check valves are provided in the inlets of the means 11 and 12. With the means 11 and the means 12 both controlled by a throttle valve V, movement of the machine part A in both directions may be restrained or controlled as required.

Fig. 4 of the drawings illustrates the device of the invention provided with another form of piston means 14ᵃ. The cylinder 10, the means 11 and 12, the piston rod 13 and the throttle valve V may be the same as described above and corresponding reference numerals are applied to their corresponding parts.

The piston means 14ᵃ includes two piston elements 75 and 76. The piston element 75 is the forward or inner piston part and has a central opening 77 slidably passing the piston rod 13. Sealing means 78 in the opening 77 slidably seals about the rod 13. A sealing ring 79 is arranged in an annular groove in the exterior of the piston element 75 to seal with the wall of the cylinder 10. In this form of the invention the head 80 on the inner end of the tubular piston rod 13 is in the form of a disc or flange and the piston element 75 may have a socket 81 which receives the head 80 with clearance. The outer piston element 76 may be a simple disc-like part provided with a peripheral annular groove carrying a sealing ring 82 for slidably sealing with the wall of the cylinder 10. The indicating rod 69 is fixed to the piston element 76 and extends forwardly to pass through the tubular piston rod 13 as in the previously described form of the invention.

The piston element 76 is spaced forwardly from the element 75 and a spring 83 is arranged under compression between the flange 80 and the element 76. The spring 83 acting against the piston element 76 maintains the liquid in the cylinder 10 under superatmospheric pressure. The spring urged piston element 76 is adapted to compensate for changes in the net capacity of the cylinder 10 due to piston rod movement, for the differential in the expansion and contraction of the liquid and the cylinder structure due to temperature changes, and for incidental leakage from the cylinder system.

The invention provides means for positively transmitting movement from the piston rod head 80 to the piston element 76 to protect the spring 83. A tube or sleeve 83ª is fixed to the head 80 and projects outwardly in surrounding relation to the rod 69. The end of the sleeve 83ª is engageable with the element 78 only during movement of the part A in a direction counter to the arrow in Fig. 4, and when the spring 83 is compressed to a substantial extent.

The operation of the structure illustrated in Fig. 4 is considerably different than that of the previously described embodiment of the invention. During the active stroke of the part A in the direction of the arrow in Fig. 4 the part contacts the outer set of nuts 55 to transmit movement to the tubular piston rod 13 and the head 80 moves into engagement with the piston element 75. This engagement results in the positive transmission of movement to the piston element 75 and the element is moved forwardly in the cylinder 10 to force the liquid through the means 11 to the outer end of the cylinder. The throttle valve V may be adjusted to resist this liquid flow to any extent so that movement of the machine part A is resisted to the desired degree. When the machine part A moves in the direction counter to the arrow in Fig. 4 it comes into engagement with the inner set of nuts 55 to transmit movement to the tubular piston rod 13. The head 80 of the piston rod transmits this movement to the piston element 76 through the sleeve 83ª and the piston element moving through the cylinder forces the liquid to flow from the rear end of the cylinder to the forward end of the cylinder through the means 12. The check valve 49 opens to allow free unrestricted flow of the liquid through the means 12.

The structure of Fig. 4 eliminates the shock or "hammer action" at the start of the active stroke resulting from the piston rod head moving into engagement with the forward piston element as it may in Figs. 1 to 3, and reduces or eliminates the "non-checking" or non-effective travel of the piston rod at the start of the active stroke. At the start of the return stroke movement is transmitted through the spring 83 to the piston element 76 and the sleeve 83ª does not jar or hammer against the piston element. During the return stroke the piston element 75 tends to lag, due to the difference in the frictional resistance developed by the unequal diametered sealing rings 78 and 79. As a result the head 80 may move away from the element. At the end of the return stroke there is some lapse of time before the active stroke begins. During the return stroke and during said lapse the compressed spring 83 pushes on the liquid in the rear portion of the cylinder, forcing the liquid through the means 12 to the forward end of the cylinder. The liquid under pressure thus supplied to the forward end of the cylinder forces the element rearwardly against the head. Accordingly, at the start of the active stroke the element 75 and the head 80 are in engagement so that no non-checking movement and the entire stroke of the rod 13 is effective in checking or controlling the movement of the part A.

If it is desired to reverse the action of the device the throttle valve V is engaged in the boss 40 of the outer head 16 and the fitting 47 and the check valve 49 are engaged in the boss 26 of the cylinder head 15. The spring 83 is removed and is engaged between the cylinder element 75 and the head 80 of the piston rod 13. When these changes have been made the head 80 is adapted to come into direct contact with the piston element 76 for the direct transmission of movement thereto when the part A is moved in the direction counter to the arrow in Fig. 4. Accordingly, the movement is transmitted directly to the liquid in the rear or outer portion of the cylinder 10 and the liquid is forced through the means 12 which is under the control of the throttle valve V adjusted to provide for the selected resistance to movement of the part A. During the return stroke of the part A movement is transmitted from the piston rod head 80 to the piston element 75 through the spring 83 and the piston element forces the liquid from the forward end of the cylinder through the means 11 to the rear end of the cylinder, this flow of fluid being substantially unrestricted.

In the embodiment of the invention illustrated in Figs. 5 to 8, inclusive, of the drawings the cylinder 10 and the means 11 and 12 may be the same as in the preceding forms of the invention and corresponding reference numerals are applied to the corresponding parts. The structure of Figs. 5 to 8, inclusive, is characterized by a piston means 14ᵇ having two piston elements 85 and 86 and separate piston rods 87 and 88 for the respective piston elements directly moved or operated by the machine part A.

The piston elements 85 and 86 are spaced apart and are of any selected construction. In the case illustrated the element 85 comprises a body or disc 89 screw-threaded on the piston rod 87, a sealing ring 90 for slidably sealing with the wall of the cylinder 10, and a block or nut 91 screw threaded on the rod 87. The cup leather or sealing ring 90 is clamped between the disc 89 and the nut 91. The piston rod 87 of the element 85 is tubular and slidably passes through the sleeve 51 and its sealing ring 54. The piston element 86 may be similar to the element 85 and may include a disc 92 screw-threaded on its piston rod 88, a sealing ring 93 and a nut 94 screw-threaded on the piston rod. The cup leather or sealing ring 93 is held or clamped between the disc 92 and the nut 94.

Coiled springs 95 are engaged under compression between the discs 89 and 92 of the piston elements 85 and 86. The springs 95 urge the piston elements away from one another and maintain the liquid in the cylinder 10 under compression. The piston elements 85 and 86 are related for relative movement to compensate for changes in the net capacity of the cylinder 10 due to movement of the piston rod 87 into and out of the cylinder 10, for the differential in the expansion and contraction of the liquid and the cylinder structure due to temperature variations, and for incidental leakage of liquid from the cylinder. The rod 88 of the piston element 86 extends forwardly to pass through the tubular piston rod 87 of the element 85. The rod 88 extends a considerable distance beyond the outer end of the rod 87.

In this form of the invention the piston rods 87 and 88 carry means that are alternately engaged by the machine part A to transmit movement to their respective piston elements 85 and 86. A collar 95 is screw threaded on the outer portion of the tubular piston rod 87 and a tube 96 extends forwardly from the collar. A flanged nut 97 may removably secure the tube 96 to the collar 95. The tube 96 is externally screw threaded and is provided with a set of adjustable nuts 98. The nuts 98 are arranged to be engaged by the machine part A when the same moves in the direction of the arrow in Fig. 5. The nuts 98 may be adjusted along the tube 96 to vary the active stroke of the device, that is, to vary the extent of movement of the part A that is resisted by the device.

The tube 96 is provided with diametrically opposite longitudinal slots 99. A nut 100 is adjustably screw-threaded on the rod 88 of the piston element 86 and carries two arms 101 which project outwardly through the slots 99. The arms 101 are spaced inwardly from the nuts 98 and are arranged to be engaged by the machine part A when the same moves in the direction counter to the arrow in Fig. 5. The part A is adapted to engage the arms 101 for the direct transmission of movement to the piston rod 88 and the piston element 86. Upon the removal of the tube 96 from around the nut 100 the nut may be adjusted along the piston rod 88. The piston rod 88 projects outwardly beyond the sleeve 96 and is provided with the indicating head 70 and the indicating band 71 which are employed in the same manner as in the previously described forms of the invention.

In the operation of the device illustrated in Figs. 5 to 8, inclusive, of the drawings the throttle valve V may be adjusted to provide for the desired degree of resistance to movement of the part A and the nuts 98 and 100 may be adjusted, as operating conditions may require. When the part A moves in the direction of the arrow in Fig. 5 it comes into engagement with the nuts 98 so that the tubular piston rod 87 and the piston element 85 are positively moved. The positively actuated piston element 85 forces the liquid from the forward portion of the cylinder through the means 11 to the rear portion of the cylinder, the flow of the liquid being restricted by the throttle valve V to provide the required degree of resistance to movement of the part A. When the machine part A moves in the direction counter to the arrow in Fig. 5 it comes into engagement with the arms 100 and movement of the part is transmitted directly to the piston rod 88 and piston element 86. The positively actuated piston element 86 moves rearwardly through the cylinder 10 to displace the liquid therefrom through the means 12 to the forward end of the cylinder. This flow of liquid is substantially unrestricted and the movement of the machine part A is unrestrained. The action of the device of Figs. 5 to 8, inclusive, may be reversed and the device may be made double acting in the same manner as the device of Figs. 1 to 3, inclusive.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A device for controlling the movement of a reciprocating part including a liquid containing cylinder, piston means in the cylinder including two relatively movable piston elements, spring means acting on at least one of said elements to urge it against the liquid in the cylinder, positive means for transmitting movement from said part to one of said elements when said part moves in one direction, means for transmitting movement from said part to the other element during movement of said part in the other direction, means for conducting liquid from one end of the cylinder to the other during movement of said part in the first named direction, means for restricting the flow through the last named means to resist movement of said part, and means for conducting liquid from one end of the cylinder to the other during movement of said part in said other direction.

2. A device for controlling the movement of a reciprocating part including a liquid containing cylinder, piston means in the cylinder including two relatively movable piston elements, spring means acting on at least one of said elements to urge it against the liquid in the cylinder, positive means for transmitting movement from said part to one of said elements when said part moves in one direction, means for transmitting movement from said part to the other element during movement of said part in the other direction, means for conducting liquid from one end of the cylinder to the other during movement of said part in the first named direction, throttle valve means for restricting the flow of liquid through the last named means so that the piston means resists movement of said part in the first named direction, and means for conducting liquid from one end of the cylinder to the other during movement of said part in the other direction.

3. A device for controlling the movement of a reciprocating part including a liquid containing cylinder, piston means in the cylinder including two relatively movable piston elements, spring means for urging the elements apart so that they are yieldingly urged against the liquid in the cylinder to subject the same to pressure, means for positively transmitting movement in one direction from said part to one of said elements and for positively transmitting movement in the other direction from said part to the other element, means for conducting liquid from one end of the cylinder to the other during movement of said part in one direction, means for controlling the flow of liquid through the last named means so that the piston means resists movement of said part, and means for conducting liquid from one end of the cylinder to the other during movement of said part in the other direction.

4. A device for controlling the movement of a reciprocating part including a liquid containing cylinder, piston means in the cylinder including two relatively movable piston elements, spring means for urging the elements apart so that they are yieldingly urged against the liquid in the cylinder to subject the same to pressure, means for positively transmitting movement in one direction from said part to one of said elements and for positively transmitting movement in the other direction from said part to the other element, means for conducting liquid from one end of the cylinder to the other during movement of said part in one direction, regulable throttle valve means for controlling the flow of liquid through the last named means so that the piston means resists movement of said part, and means for conducting liquid from one end of the cylinder to the other during movement of said part in the other direction.

5. A device for controlling the movement of a reciprocating part including a liquid containing cylinder, piston means in the cylinder including two relatively movable piston elements, spring means for urging the elements apart and against the liquid in the cylinder to subject the liquid to pressure and yieldable to compensate for changes in the net capacity of the cylinder and for the differential in the expansion of the liquid and cylinder due to temperature changes, piston rod means for positively transmitting movement from said part to one of the elements during movement of said part in one direction and for positively transmitting movement from said part to the other element during movement of said element in the other direction, means for conducting liquid from one end of the cylinder to the other during movement of the piston means, and valve means for controlling the flow of liquid through the last named means so that movement of said part is resisted.

6. A device for controlling the movement of a reciprocating part including a liquid containing cylinder, piston means in the cylinder including two relatively movable piston elements, spring means for urging the elements apart so that they exert a yielding pressure on the liquid in the cylinder, a piston rod reciprocated by said part, a head on the rod between said elements movable into engagement with one element to move the same when said part moves in one direction and movable into engagement with the other element to move the same when said part moves in the other direction, means for conducting liquid between the opposite ends of the cylinder during movement of the piston means, and means for restricting the flow of the liquid between the ends of the cylinder in at least one direction so that the movement of said part is controlled.

7. A device for controlling the movement of a reciprocating part including a liquid containing cylinder, piston means in the cylinder including two relatively movable piston elements, spring means for urging the elements apart so that they exert a yielding pressure on the liquid in the cylinder, said elements being spaced apart and the spring means including a spring engaged between the elements, a piston rod reciprocated by said part, a head on the rod between said elements movable into engagement with one element to move the same when said part moves in one direction and movable into engagement with the other element to move the same when said part moves in the other direction, means for conducting liquid between the opposite ends of the cylinder during movement of the piston means, and means for restricting the flow of the liquid between the ends of the cylinder in at least one direction so that the movement of said part is controlled.

8. A device for controlling the movement of a reciprocating part including a liquid containing cylinder, piston means in the cylinder including two relatively movable piston elements, spring means for urging the elements apart so that they exert a yielding pressure on the liquid in the cylinder, a piston rod reciprocated by said part, a head on the rod between said elements movable into engagement with one element to move the same when said part moves in one direction and movable into engagement with the other element to move the same when said part moves in the other direction, separate means for conducting liquid from one end of the cylinder to the other, and regulable means for restricting the flow of liquid through at least one of said separate means to control movement of said part.

9. A device for controlling the movement of a reciprocating part including a liquid containing cylinder, piston means in the cylinder including two relatively movable piston elements, the elements being spaced one from the other, a spring engaged between said elements for yieldingly urging them apart to maintain the liquid under pressure, a piston rod reciprocated by said part and entering the cylinder, a head on the rod between said elements for alternately engaging said elements during reciprocation of the rod to move the elements through the cylinder, two separate means for conducting fluid between the opposite ends of the cylinder, valve means for restricting the flow through one of said separate means to resist movement of said part in one direction, and check valve means in the other of said separate means allowing the flow of liquid during movement of said part in the other direction.

10. A device for controlling the movement of a reciprocating part including a liquid containing cylinder, piston means in the cylinder including two relatively movable piston elements, the elements being spaced one from the other, a spring engaged between said elements for yieldingly urging them apart to maintain the liquid under pressure, a piston rod reciprocated by said part and entering the cylinder, a head on the rod between said elements for alternately engaging said elements during reciprocation of the rod to move the elements through the cylinder, two separate means for conducting fluid between the opposite ends of the cylinder, valve means for restricting the flow through one of said separate means to resist movement of said part in one direction, and check valve means in the other of said separate means allowing the flow of liquid during movement of said part in the other direction, said valve means and check valve being exchangeable one for the other to reverse the action of the device.

11. A device for controlling the movement of a reciprocating part including a liquid containing cylinder, piston means in the cylinder including two relatively movable piston elements, a piston rod reciprocated by said part and extending into the cylinder, a head on the rod between the elements engageable with one element to positively move the same when said part moves in one direction, means for conducting liquid from one end of the cylinder to the other during such movement of said element, means for restricting the last named means to resist movement of said part, a spring engaged between the head and the other element for transmitting movement to said other element, and means for conducting fluid from one end of the cylinder to the other during movement of said other element.

12. A device for controlling the movement of a reciprocating part including a liquid containing cylinder, piston means in the cylinder including two relatively movable piston elements, a piston rod reciprocated by said part and extending into the cylinder, a head on the rod between the elements engageable with one element to positively move the same when said part moves in one direction, means for conducting liquid from one end of the cylinder to the other during such movement of said element, means for restricting the last named means to resist movement of said part, a spring engaged between the head and the other element for transmitting movement to said other element and for yieldingly urging said other element against the liquid in the cylinder to maintain the liquid under pressure, and means for conducting fluid from one end of the cylinder to the other during movement of said other element.

13. A device for controlling the movement of a reciprocating part including a liquid containing cylinder, piston means in the cylinder including two relatively movable piston elements, a piston rod reciprocated by said part and extending into the cylinder, a head on the rod between the elements engageable with one element to positively move the same when said part moves in one direction, means for conducting liquid from one end of the cylinder to the other during such movement of said element, manually regulable valve means for restricting the last named means to resist movement of said part, a spring engaged between the head and the other element for transmitting movement to said other element, and means for conducting fluid from one end of the cylinder to the other during movement of said other element.

14. A device for controlling the movement of a reciprocating part including a liquid containing cylinder, piston means in the cylinder including two relatively movable piston elements, and a spring engaged between the elements yieldingly urging them against the liquid in the cylinder, a tubular piston rod on one element extending from the cylinder, a piston rod on the other element extending through the tubular rod, members on the rods alternately engaged by said parts to transmit movement to said elements, separate means for conducting liquid between the ends of the cylinder, and means for limiting the flow through one of the last named means to resist movement of said part.

15. A device for controlling the movement of a reciprocating part including a liquid containing cylinder, piston means in the cylinder including two relatively movable piston elements, and a spring engaged between the elements yieldingly urging them against the liquid in the cylinder, a tubular piston rod on one element extending from the cylinder, a piston rod on the other element extending through the tubular rod, members on the rods alternately engaged by said parts to transmit movement to said elements, separate means for conducting liquid between the ends of the cylinder, and regulable valve means for limiting the flow through one of the last named means to resist movement of said part.

16. A device for controlling the movement of a reciprocating part including a liquid containing cylinder, piston means in the cylinder including two relatively movable piston elements, spring means acting on at least one of said elements to urge it against the liquid in the cylinder, positive means for transmitting movement from said part to one of said elements when said part moves in one direction, means for transmitting movement from said part to the other element during movement of said part in the other direction, means for conducting liquid from one end of the cylinder to the other during movement of said part in the first named direction, means for restricting the flow through the last named means to resist movement of said part, means for conducting liquid from one end of the cylinder to the other during movement of said part in the other direction, and means for indicating the quantity of liquid in the cylinder.

17. A device for controlling the movement of a reciprocating part including a liquid containing cylinder, piston means in the cylinder including two relatively movable piston elements, spring means acting on at least one of said elements to urge it against the liquid in the cylinder, positive means for transmitting movement from said part to one of said elements when said part moves in one direction, means for transmitting movement from said part to the other element during movement of said part in the other direction, means for conducting liquid from one end of the cylinder to the other during movement of said part in the first named direction, means for restricting the flow through the last named means to resist movement of said part, means for conducting liquid from one end of the cylinder to the other during movement of said part in the other direction, and means for indicating the quantity of liquid in the cylinder including an indicating rod on one of said elements extending from the cylinder.

NEIL V. SMITH.